W. O. Jones.
Windlass.
N° 80,968.  Patented Aug. 11, 1868.
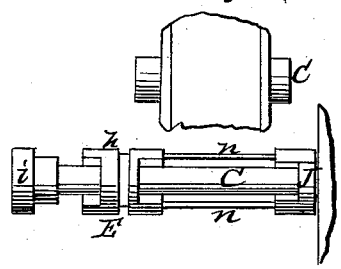
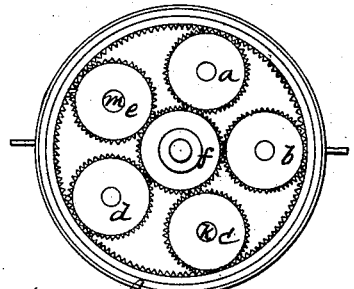
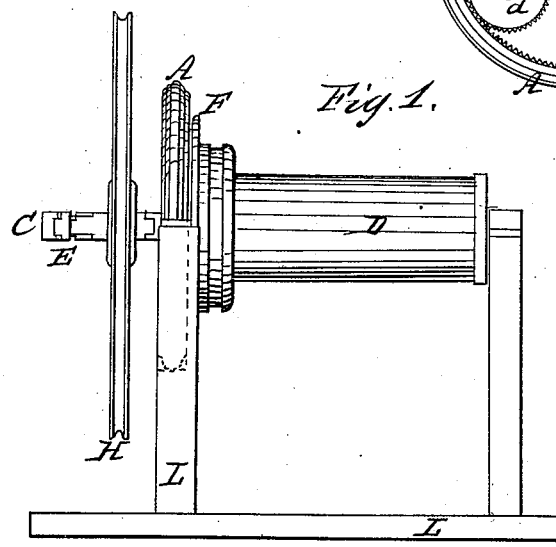
Witnesses  
Henry C. Houston  
Wm Frank Seavey
Inventor  
W. O. Jones  
Per W. H. Clifford  Atty

United States Patent Office.

W. O. JONES, OF PORTLAND, MAINE.

Letters Patent No. 80,968, dated August 11, 1868.

---

IMPROVEMENT IN HOISTING-GEAR.

---

The Schedule referred to in these Letters Patent and making part of the same.

---

TO ALL WHOM IT MAY CONCERN:

Be it known that I, W. O. JONES, of Portland, in the county of Cumberland, and State of Maine, have invented a new and useful Improved Hoisting-Gear; and I hereby declare the following to be a full, clear, and exact description thereof, which will enable others to make and use my invention, reference being had to the accompanying drawings, forming a part of this specification, in which—

Figure 1 is a side elevation of my invention.

Figure 2 is a detail of the clutch.

Figure 3 is a face view of the gears.

My invention consists in the combination of a large circle with internal gear, with several smaller gears matching into said larger gear, operated by a shaft.

It also consists of a method of operating or revolving the drum or shaft with varying degrees of speed and power.

A shows a large internal gear; $a\ b\ c\ d\ e$, smaller gears, matching into the larger gear A. $f$ is a geared wheel around the shaft C. D is a drum. E is a clutch, to change the application of the power from the shaft C to the outer edge or the periphery of the face-plate F.

The shaft and wheel are supported by any convenient frame, as L.

H is a large wheel, to which power may be applied. The sliding part of the clutch is seen at $h$, the fixed parts at $i\ j$. When the projection of the sliding part $h$ is entered in the recess for it in $i$, then the revolution of the large wheel H simply revolves the shaft C, which shaft turns the drum D, and with it the face-plate F, and this face-plate carries the two gears $e$ and $c$, which impart motion to $f$, and thus move all the small gears. Under these circumstances, the drum D revolves with the same speed as the wheel H.

When the clutch is entered into the recesses in $j$, then it revolves the wheel $f$, which also revolves the fixed gears $e\ c$, which have shafts $k\ m$ on the face-plate F. Thus, when the clutch is inserted at the recesses in $j$, the drum D is turned by force applied near the circumference of F, which greatly increases the power, or the ease with which D is turned, although, of course, the movement of D is then slower than when moved by the clutch inserted at $i$. By means of rods $n\ n'$, when one end of the sliding part $h$ is inserted, the other is withdrawn. When unconnected with either $i$ or $j$, the wheel H is free on the shaft C.

All of the small gears, both those that are fixed on shafts and those that revolve freely, serve as friction-rollers for the gear $f$ of the shaft C. The said gear $f$ is free on the shaft C.

Thus a machine is supplied which can operate with greater or less speed, when desired, and with greater or less power.

I do not claim the gears $a\ b$, &c., broadly, for they have been before applied to the inner periphery of a larger gear.

Instead of $e$ and $c$, or any other two of the smaller gears, only one may be furnished with the shafts, as $m$ and $k$, or all may have them, as desired.

I do not, of course, claim a train of gears arranged around a central shaft, which also has a gear fixed upon it, but my invention applies to the particular arrangement shown and described herein.

The patent of Jacob Edson, No. 70,180, October 29, 1867, is different from mine, and I do not claim the specified arrangement of a lever-pawl, a brake, a windlass-barrel, a brake-pulley, ratchet, shaft, and train of gears on the inner side of a ratchet revolving on a shaft.

Neither do I claim the combination of a screw-arm with a brake and lever-pawl, for the purpose of causing the brake to act with friction on a brake-pulley. This combination is different from mine, and its method of operation is not the same.

I have already specified my invention to be applicable to a variety of uses, such as, for example, twisting or "laying up" rope, &c., by so arranging the gears as to obtain the necessary speed of revolution of the drum.

It is obvious that my invention may be applied to a variety of uses.

What I do claim as my invention, and desire to secure by Letters Patent, is—

1. The combination of the geared wheel $f$ with the gears $c$ and $e$, having shafts $k$ and $m$ on the face-plate F, and when the clutch $h$ is inserted at the recesses in $j$, substantially as and for the purposes set forth.

2. The combination of the clutch $h$ $i$, on shaft C, with the gears $a$ $b$ $c$ $d$ $e$, and gear $f$, as and for the purposes set forth.

3. The combination of the small gears $a$ $b$ $c$ $d$ $e$, both fixed and free, when serving in connection with $f$, not only as levers to revolve the face-plate F, as is the case with the gears having shafts, but also as friction-rollers for the shaft C, substantially as herein set forth.

W. O. JONES.

Witnesses:
  WM. HENRY CLIFFORD,
  HENRY C. HOUSTON.